United States Patent
D'Souza et al.

(10) Patent No.: US 6,571,316 B1
(45) Date of Patent: May 27, 2003

(54) CACHE MEMORY ARRAY FOR MULTIPLE ADDRESS SPACES

(75) Inventors: Godfrey P. D'Souza, San Jose, CA (US); Paul S. Serris, Sunnyvale, CA (US)

(73) Assignee: Transmeta Corporation, Santa Clara, CA (US)

( * ) Notice: Subject to any disclaimer, the term of this patent is extended or adjusted under 35 U.S.C. 154(b) by 107 days.

(21) Appl. No.: 09/595,077

(22) Filed: Jun. 16, 2000

(51) Int. Cl.[7] ............................................... G06F 12/06
(52) U.S. Cl. ...................................................... 711/129
(58) Field of Search ................................. 711/118, 129, 711/209; 712/209

(56) References Cited

U.S. PATENT DOCUMENTS

| | | | | |
|---|---|---|---|---|
| 5,768,593 A | * | 6/1998 | Walters et al. | 395/205 |
| 5,809,522 A | * | 9/1998 | Novak et al. | 711/118 |
| 6,298,411 B1 | * | 10/2001 | Giacalone | 711/3 |
| 6,430,674 B1 | * | 8/2002 | Trivedi et al. | 712/43 |
| 6,470,492 B2 | * | 10/2002 | Bala et al. | 717/128 |

* cited by examiner

*Primary Examiner*—Kevin L. Ellis
(74) *Attorney, Agent, or Firm*—Wagner, Murabito & Hao LLP

(57) ABSTRACT

Apparatus including a cache having a plurality of storage positions for data and for addresses, each of the storage positions including in the storage positions signifying one of a plurality of address spaces; and selection circuitry selecting data from a storage position based on an address including an address space indicator.

19 Claims, 4 Drawing Sheets

CACHE MEMORY ARRAY FOR MULTIPLE ADDRESS SPACES

BACKGROUND OF THE INVENTION

1. Field of the Invention

This invention relates to computer memory systems and, more particularly, to processor cache circuitry which stores information from multiple address spaces.

2. History of the Prior Art

Recently, a new microprocessor was developed which combines a simple but very fast host processor (called a "morph host") and software (called "code morphing software") to execute application programs designed for a processor having a different instruction set at a rate equivalent to that of the processor for which the programs were designed (the target processor). The morph host processor executes the code morphing software to translate the application programs into morph host processor instructions which accomplish the purpose of the original target software. As the target instructions are translated, they are stored in a translation buffer where they may be accessed without further translation. The resulting translations are then executed and perform the same functions that they would on a processor that implemented the target architecture in hardware. Although the initial translation and execution of a program may be slow, once translated, many of the steps normally required to execute a program in hardware are eliminated. The new processor is described in detail in U.S. Pat. No. 6,031,992, entitled *Combining Hardware And Software To Provide An Improved Microprocessor*, Cmelik et al, issued Feb. 29, 2000, and assigned to the assignee of the present application.

In order to carry out its operations, the host processor must be able to access two different types of memory, host memory and target memory. The instructions executed by the morph host, including both the code morphing software which accomplishes the translations and the translations themselves, reside in host memory. The target instructions and data manipulated by the target instructions reside in target memory.

During the translation process, code morphing software must manipulate various kinds of data including, among other things, data related to the translations and the state of the target program. In addition, code morphing software uses numerous data structures to perform various optimizations on the translated instructions. This data also resides in host memory.

To prevent corruption of code morphing software state, the target program must be kept from reading or writing host memory. The host processor must therefore be able to distinguish between host and target memory as two different "address spaces." Distinguishing between these address spaces is not possible utilizing techniques known to the prior art because prior art processors do not dynamically translate instructions from a target to a host instruction set and therefore do not utilize these different memory spaces.

Like other processors, the host processor includes a cache which enhances performance by storing a copy of frequently accessed memory locations that can be read and written much more quickly than external memory. The cache has much smaller capacity than main memory because it is physically located on the processor rather than on external memory chips. Since the host processor must access both host and target memory, its cache must also be able to access both host and target memory.

During the translation process, a need for local or "scratch memory" to assist with the translation process also arises. The translation process creates a significant amount of non-permanent state. The translation process also requires information about the state of the target program which may be frequently accessed. Typically, such information would be placed in processor registers. However, the translation process requires various data structures and other larger groups of information which cannot be conveniently stored in registers but should be available more rapidly than access to system memory provides.

It is therefore desirable to provide improved processor caches and arrangements for accessing processor caches and local memory utilized by a processor.

SUMMARY OF THE INVENTION

The present invention is realized by apparatus including a cache having a plurality of storage positions for data and for addresses, each of the storage positions including positions signifying one of a plurality of address spaces; and selection circuitry selecting data from a storage position based on an address including an address space indicator.

These and other features of the invention will be better understood by reference to the detailed description which follows taken together with the drawings in which like elements are referred to by like designations throughout the several views.

DETAILED DESCRIPTION

Figure 1:
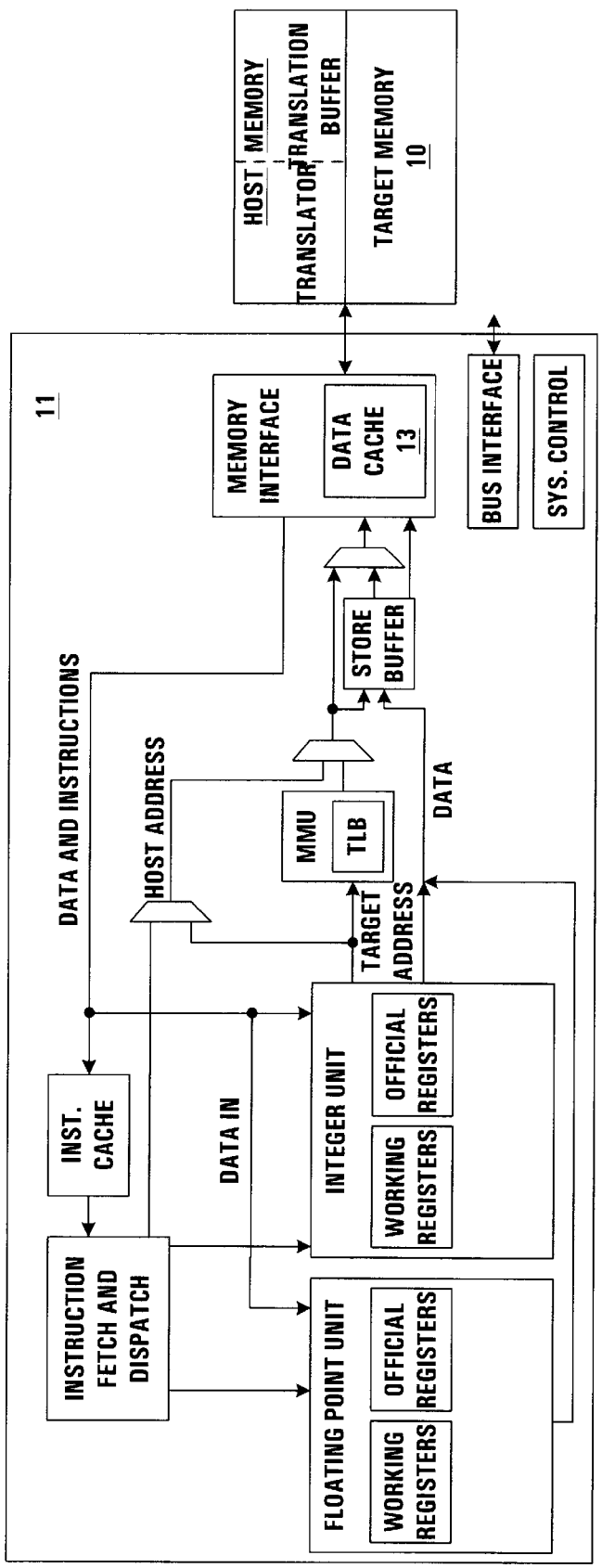
FIG. 1 is a block diagram of a microprocessor designed in accordance with the present invention.

Referring now to FIG. 1, there is illustrated a block diagram of a new processor 11 associated in a computer system with system memory 10. The processor 11 includes integer and floating point units and associated circuitry for manipulating data in a manner described in the aforementioned U. S. patent. Among the associated circuitry is included a processor cache 13 designed in accordance with the present invention which stores recently used information so that it is more immediately available to the processing units than is information from system memory.

Figure 2:
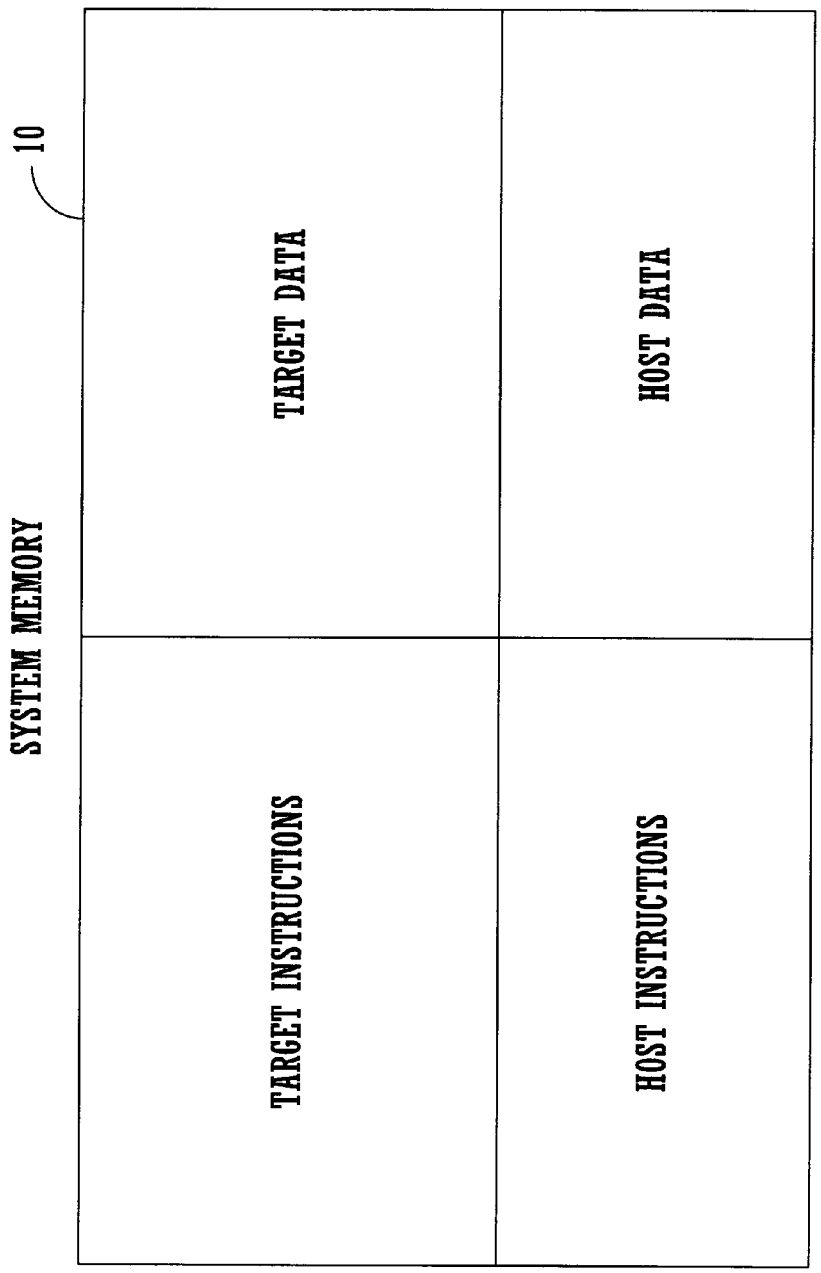
FIG. 2 is a diagram illustrating the different memory spaces in a computer using the present invention.

As is illustrated in FIG. 2, the system memory 10 includes sections storing target instructions, target data, host instructions, and host data. These sections are illustrated as logically (although not necessarily physically) separated from one another in the figure. As explained above, these address spaces must be distinguishable so that target programs which utilize target information cannot corrupt host operations. To facilitate this result, information from these different memory address spaces stored in the processor cache 13 must also be maintained separately.

One way to implement separate address spaces in a cache is to include separate caches on the processor for host memory and for target memory. However, two caches are more complex and less efficient than a single cache. During the translation process, most of the memory accesses are to host memory so the host memory cache would be heavily used, while the target cache would be mostly unused. On the other hand, during the execution of translations, most of the memory accesses are to target memory so the target memory cache would be heavily used, while the host cache would be mostly idle.

A more efficient way to implement separate memory spaces is to utilize a single cache that can distinguish between these two memory spaces. To distinguish between these address spaces, the processor of the present invention uses an "address space indicator" (ASI) which is a token associated with a memory address that indicates whether the address refers to the host or target memory space. Every memory address used by the processor, whether it is a data or instruction address, has an ASI associated with it. An ASI is stored in the cache along with the address allowing both target and host memory locations to be stored in a single cache unit.

This arrangement using an address space indicator to distinguish information in a single cache assures that when the processor is translating target instructions so that most memory references are to host memory, the cache contains mostly host memory locations. On the other hand, when the processor is executing translations and most memory references are to target memory, the cache contains mostly target locations. Thus, the single cache arrangement has higher utilization efficiency than a dual-cache scheme.

Figure 3:
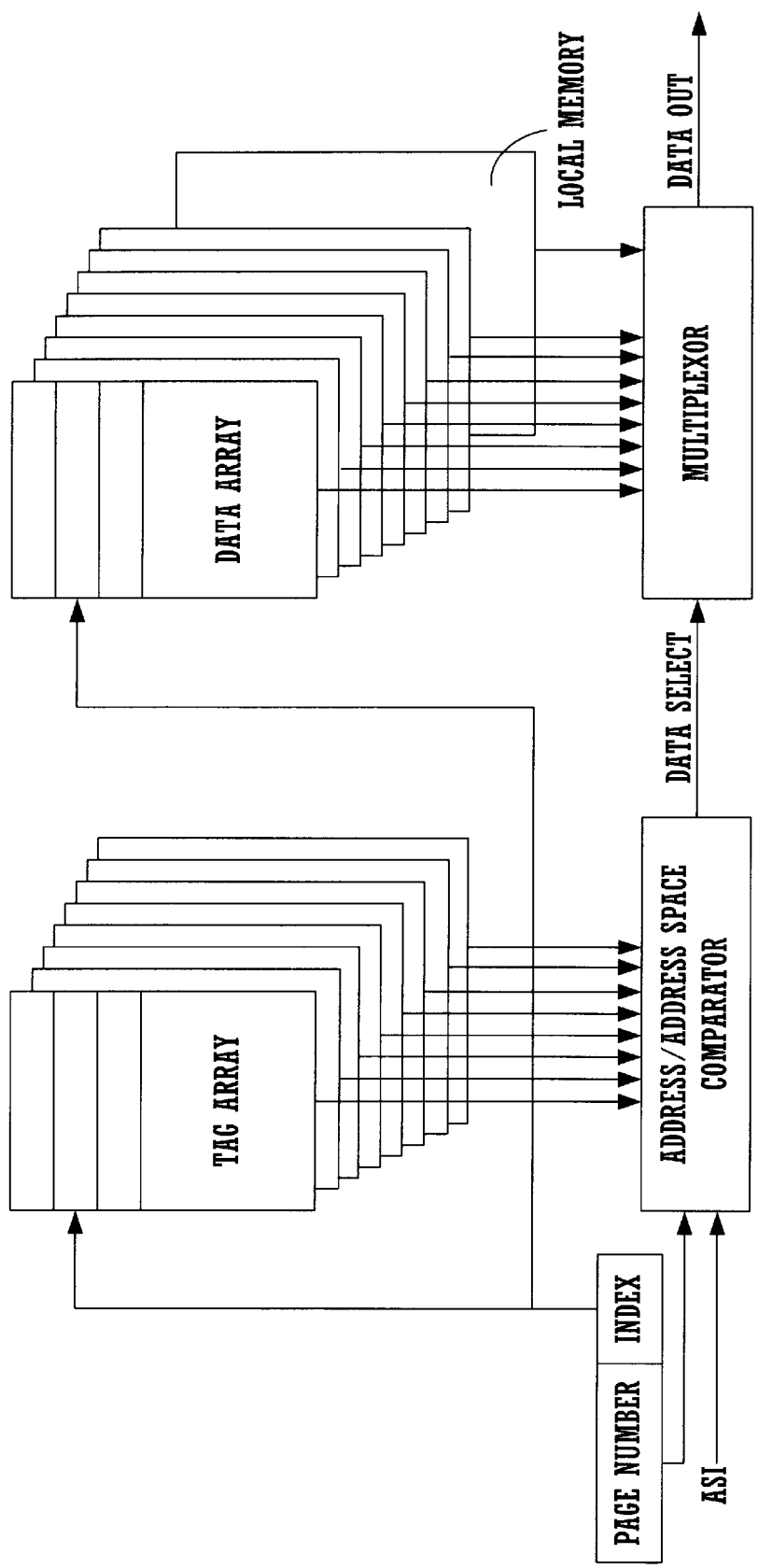
FIG. 3 is a block diagram illustrating a data cache constructed in accordance with the present invention.

A host processor including one particular embodiment of the inventive cache is shown in FIG. 3. The cache is capable of storing data from both the host and target memory address spaces including target instructions, target data, and host data. It will be understood that since target instructions are not executed by the host processor but are translated into host instructions which are executed, target instructions represent data to the host processor.

The particular embodiment of the host processor illustrated contains an eight-way set-associative data cache. The cache consists of a tag array, a data array, comparison logic, and multiplexing logic. The tag array contains eight sub-arrays ("ways") that may be read in parallel. Each tag way is an array of tag entries. The data array also contains eight data ways that are accessed in parallel.

Figure 4:
FIG. 4 is a diagram illustrating a tag entry utilized to implement the present invention.

A tag entry is illustrated in FIG. 4. The tag contains three fields: a "valid" bit indicating that the corresponding entry is present in the cache; a "page number" indicating the upper bits of the cached memory address; and a "space" bit indicating whether the cached memory address is in the host or target memory address space. If the space bit is 1, then the cached memory is target memory; if the space bit is 0, then the cached memory is host memory.

A memory address is divided into two parts: the lower bits are the "index," and the upper bits are the "page number." In the particular processor, a memory address is always accompanied by an ASI.

To perform a cache read operation, the index portion of a memory address is sent to both the tag array and data array. The indexed tag entry is read from each of the eight ways and sent to the comparator logic. The page number from the address and the ASI are also sent to the comparator logic. The comparator logic compares each tag entry to the incoming address and ASI to determine if any of the tags match. A tag matches the address and ASI if all of the following are true: the valid bit is set to 1, the page number in the tag equals the page number of the address, and the space bit indicates the same address space as the ASI.

If one of the tag entries matches the address and the ASI, then the comparator indicates the match on the data select output. This output is sent to the multiplexor which selects the corresponding data entries and sends it to the data out output.

For example, if the tag entry from way seven matched the incoming address and ASI, then the data select signal would indicate that data way seven should be sent to the data out output.

The space bit in the tag entry allows the cache to contain both host and target memory locations. Without this bit (or some similar indication), the cache could not distinguish between a host memory address with the same numeric value as a target memory address.

The single data cache which holds data from different address spaces is particularly adapted to implement a local memory array. As explained above, a need for local or "scratch memory" to assist with the translation process also arises when using the host processor. Local memory may be used in several ways by code morphing software. The translation process creates a significant amount of non-permanent state. The translation process also requires information about the state of the target program which may be frequently accessed. Once the translation is completed, the memory is no longer needed and can be reused during the processing of another translation. Although some such information can be placed in processor registers, the translation process requires various data structures and other larger groups of information which cannot be conveniently stored in registers but should be available more rapidly than access to system memory provides.

This local or scratch memory is physically located on the processor so that accessing it is fast. However, this memory is much smaller than the host or target memory portions of main memory which are located on external memory chips. Local memory is considered to be a separate address space which is distinguished from host or target memory by a different ASI.

Although the local memory is conceptually different than the cache, the actual circuitry used to implement local memory is very similar to the cache circuitry. In fact, the local memory may be implemented alongside the cache and share some circuitry with the cache. This reduces the overhead associated with local memory at a slight increase in complexity.

In FIG. 3, a local memory array is located in the same structure as the data cache arrays and has a similar physical implementation to one of the data ways. This arrangement allows the local memory to share some of the circuitry and wiring with the data arrays.

For host and target memory, the cache tags store the upper bits (page number) of the memory address and are used by the comparator to determine whether the desired memory location is present in the cache. Local memory addresses do not use these upper bits, since all of local memory may be referenced by the lower address bits (index). Therefore the local memory does not use cache tags.

To access local memory, the address comparator block in FIG. 3 contains logic to detect whether the specified ASI is for local memory rather that host or target memory. If the local memory ASI is detected, then the comparator overrides the normal tag comparison results and indicates on the Data Select output that local memory should be selected. The multiplexor then delivers data from the Local memory array to the Data Out output.

It should be noted that the associativity of the cache is not limited to eight. A larger associativity does not preclude the use of a local memory array.

Larger local memory spaces are possible as well. A second local memory array may be included in the cache in FIG. 3. It can be distinguished from the first local memory array by using one more address bit. This additional address bit would be examined by the address comparator block and used to select between the two local memory arrays when the ASI indicates the local memory space. In this way, the available local memory may increased with minimal increase in complexity.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A cache for a processor having a plurality of storage positions for data and for addresses of the data, each of the storage positions including in the storage positions signifying one of at least a first address space and a second address space, wherein the first address space includes instructions native to the processor and the second address space includes instructions that are not native to the processor; and selection circuitry selecting data from a storage position based on an address including an address space indicator.

2. The cache of claim 1 wherein the first address space is a host address space configured to support a translation process comprising instructions native to the processor.

3. The cache of claim 2 wherein the second address space is a target address space configured to maintain instructions that are not native to the processor and to support accesses by the translation process to the target address space.

4. The cache of claim 3 wherein the processor is configured to dynamically translate target instructions from the target address space into host instructions from the host address space.

5. The cache of claim 1 wherein the address space indicator is configured for storage with a corresponding address in the storage positions of the cache.

6. The cache of claim 5 wherein each of the storage positions of the cache are configured to store the address space indicator with the corresponding address to indicate whether the first address space or the second address space is signified.

7. The cache of claim 1 wherein the cache comprises an eight-way set-associative data cache.

8. The cache of claim 1 wherein the selection circuitry comprises comparator logic configured to select data from the storage position based on the address space indicator.

9. The cache of claim 1 wherein the cache comprises a local memory array for the processor.

10. A cache having multiple address spaces for a processor, comprising:

a memory having a plurality of storage positions for data and for addresses of the data, each of the storage positions including an address space identifier signifying one of at least a first address space and a second address space, wherein the first address space includes instructions native to the processor and the second address space includes instructions that are not native to the processor;

selection circuitry coupled to the memory for selecting data from a storage position based on an address including the address space indicator;

the first address space configured as a host address space to support a translation process comprising instructions native to the processor; and the second address space configured as a target address space to maintain instructions that are not native to the processor and to support accesses by the translation process to the target address space.

11. The cache of claim 10 wherein the processor is configured to dynamically translate target instructions from the target address space into host instructions from the host address space.

12. The cache of claim 10 wherein the address space indicator is configured for storage with a corresponding address in the storage positions of the cache.

13. The cache of claim 12 wherein each of the storage positions of the cache are configured to store the address space indicator with the corresponding address to indicate whether the first address space or the second address space is signified.

14. The cache of claim 10 wherein the cache comprises an eight-way set-associative data cache.

15. The cache of claim 10 wherein the selection circuitry comprises comparator logic configured to select data from the storage position based on the address space indicator.

16. The cache of claim 10 wherein the cache comprises a local memory array for the processor.

17. A method for implementing multiple address spaces in a cache for a processor, comprising:

accessing a plurality of storage positions for data and for addresses of the data, each of the storage positions including in the storage positions signifying one of at least a first address space and a second address space, wherein the first address space includes instructions native to the processor and the second address space includes instructions that are not native to the processor;

selecting data from a storage position based on an address including an address space indicator by using selection circuitry;

configuring the first address space as a host address space to support a translation process comprising instructions native to the processor; and configuring the second address space as a target address space to maintain instructions that are not native to the processor and to support accesses by the translation process to the target address space.

18. The method of claim 17 wherein the processor is configured to dynamically translate target instructions from the target address space into host instructions from the host address space.

19. The method of claim 17 wherein the cache comprises a local memory array for the processor.

* * * * *